(12) United States Patent
Morel et al.

(10) Patent No.: US 12,434,854 B2
(45) Date of Patent: Oct. 7, 2025

(54) METHOD AND DEVICE FOR DETECTING A FAULT IN A MECHANICAL SYSTEM COMPRISING AT LEAST ONE ROTATING MEMBER

(71) Applicant: AIRBUS HELICOPTERS, Marignane (FR)

(72) Inventors: Hervé Morel, Aix en Provence (FR); Jérémy Jouve, Senas (FR); Anas Had, Roanne (FR); Hugo Andre, Roanne (FR); Mohamed El Badaoui, Riorges (FR)

(73) Assignee: AIRBUS HELICOPTERS, Marignane (FR)

( * ) Notice: Subject to any disclaimer, the term of this patent is extended or adjusted under 35 U.S.C. 154(b) by 127 days.

(21) Appl. No.: 18/396,512

(22) Filed: Dec. 26, 2023

(65) Prior Publication Data
US 2024/0253811 A1     Aug. 1, 2024

(30) Foreign Application Priority Data

Jan. 30, 2023   (FR) ..................................... 2300829

(51) Int. Cl.
*B64D 45/00*         (2006.01)
*B64C 27/12*         (2006.01)

(52) U.S. Cl.
CPC .............. *B64D 45/00* (2013.01); *B64C 27/12* (2013.01); *B64D 2045/0085* (2013.01)

(58) Field of Classification Search
CPC ....................... B64D 45/00; B64D 2045/0085; B64C 27/12; G01M 13/028; G01M 13/045
See application file for complete search history.

(56) References Cited

U.S. PATENT DOCUMENTS 6,651,012 B1 * 11/2003 Bechhoefer ............ G01N 29/46
                                                    455/431
7,882,394 B2 *  2/2011 Hosek .................... G06F 11/008
                                                    714/48
(Continued)

FOREIGN PATENT DOCUMENTS

CN          102426102 A      4/2012
FR            3014502 A1      6/2015

OTHER PUBLICATIONS

A review of Vibration-Based Techniques for Helicopter Transmission Diagnostics by P. D. Samuel (Journal of Sound and Vibration, 2005).
(Continued)

*Primary Examiner* — Mussa A Shaawat
(74) *Attorney, Agent, or Firm* — BROOKS KUSHMAN P.C.

(57) ABSTRACT

A method and a device for detecting a fault in a mechanical system comprising a rotating member and a vibration sensor transmitting a temporal vibration signal. The method comprises processing the temporal vibration signals transmitted over a predetermined period in order to transform the temporal vibration signals firstly into angular vibration signals, then into frequency vibration signals. Next, series of amplitudes are generated, each series being associated with a specific frequency channel and comprising the amplitudes of the frequency vibration signals for this frequency channel. The frequency channels displaying an increasing trend consistent with the fault of interest are then identified. The frequency channels that display an increasing trend are then compared with characteristic frequencies of a known fault of interest in order to check for the possible presence of such a fault in the mechanical system.

17 Claims, 1 Drawing Sheet

(56) References Cited

U.S. PATENT DOCUMENTS

| | | | | |
|---|---|---|---|---|
| 8,868,287 | B2* | 10/2014 | Delaye | G05B 23/0283 |
| | | | | 701/29.3 |
| 9,008,942 | B2* | 4/2015 | Dyrla | B64D 35/02 |
| | | | | 701/99 |
| 9,045,223 | B2* | 6/2015 | Connaulte | B64D 27/33 |
| 9,607,451 | B2* | 3/2017 | Mouterde | G05B 23/0235 |
| 2005/0177321 | A1* | 8/2005 | Wang | B41F 13/012 |
| | | | | 702/35 |
| 2010/0319357 | A1* | 12/2010 | Gazzino | F02C 7/26 |
| | | | | 60/778 |
| 2020/0277072 | A1* | 9/2020 | Zoppitelli | B64F 5/60 |
| 2024/0025552 | A1* | 1/2024 | Cerqueira | F01D 15/10 |

OTHER PUBLICATIONS

A Review on Vibration-Based Condition Monitoring of Rotating Machinery by Monica Tiboni (Department of Mechanical and Industrial Engineering, University of Brescia, 2022).
Cepstrum Analysis and Gearbox Fault Diagnosis by R. B. Randall (Bruel & Kjaer).
French Search Report for French Application No. FR2300829, Completed by the French Patent Office, Dated Sep. 11, 2023, 25 pages.

* cited by examiner

METHOD AND DEVICE FOR DETECTING A FAULT IN A MECHANICAL SYSTEM COMPRISING AT LEAST ONE ROTATING MEMBER

CROSS REFERENCE TO RELATED APPLICATION

This application claims priority to FR 23 00829 filed on Jan. 30, 2023, the disclosure of which is incorporated in its entirety by reference herein.

TECHNICAL FIELD

The present disclosure lies in the field of systems for monitoring the operation of mechanical systems, in particular mechanical systems comprising at least one rotating member.

The present disclosure relates to a method for detecting a fault in a mechanical system comprising at least one rotating member and a fault detection device configured to implement such a method.

BACKGROUND

Such a mechanical system comprises at least one rotating member, for example an input shaft and/or an output shaft. For the sake of simplification, a mechanical system comprising at least one rotating member is referred to hereinafter as a "mechanical system".

For example, a mechanical system may comprise one or more bearings for guiding one or more rotating members in rotation. A bearing comprises, for example, a rolling bearing provided with one or more rows of rolling elements such as balls, rollers or the like.

Such a mechanical system may also be provided with at least one toothed wheel, pinion or toothed ring gear in order to reduce or increase the speed of rotation between two rotating members of the mechanical system, in particular between an input shaft and an output shaft.

Such a mechanical system may, for example, be provided with an epicyclic gear train providing a high rotational speed reduction ratio between two rotating members of the mechanical system.

Such a mechanical system may, for example, be a transmission or a gearbox of a vehicle, in particular an aircraft.

A failure or malfunction in such a mechanical system may arise, for example, following the occurrence of a fault in a bearing, in particular a rolling bearing, and/or in a toothed wheel, pinion or toothed ring gear. Such a fault may, for example, be in the form of a crack, spall, fracture or even breakage in a toothed wheel, pinion, toothed ring gear or bearing. Such a fault may also be in the form of a rolling element seizing up.

Some monitoring systems, known as Health and Usage Monitoring Systems or HUMS, are designed to monitor one or more mechanical systems, using various sensors to track changes in a set of monitoring indicators. These monitoring indicators are calculated from measurements taken by one or more sensors in order to characterize the state and operation of each mechanical system. For example, a monitoring indicator may be defined by a signal supplied by one sensor or by combining signals from several sensors. Several monitoring indicators may also make use of the measurements from one and the same sensor by taking into account various characteristics of the signal supplied by this sensor, such as its time or frequency spectrum.

Changes in each monitoring indicator may be compared with a detection threshold in order to detect or anticipate a possible fault or failure in the mechanical system that is being monitored. The value of each detection threshold may be obtained by experience, by statistical analysis of a history of measurements from several similar mechanical systems or by individual learning on a given mechanical system.

A monitoring indicator may be in the form of a vibration indicator evaluated using a sensor comprising at least one accelerometer, tachometer or strain gauge, for example. Such a monitoring indicator may in this case be equal to the maximum amplitude of a temporal vibration signal supplied by an accelerometer, for example.

For a vibration signal varying in the time domain, an indicator may be determined from statistical functions such as the root mean square, the peak factor, the skewness or the kurtosis of a distribution, for example.

For a vibration signal expressed in the frequency domain, an indicator may be determined from the mean frequency or from the standard deviation frequency.

Other indicators can be constructed from time and frequency decompositions of the signal such as the wavelet transform, empirical mode decomposition or the Short-Time Fourier Transform, for example.

Most of these indicators are calculated from pre-processing operations carried out on a raw signal measured by a sensor in order to eliminate or significantly reduce the noise and/or fluctuations in the speed of the components being monitored. Among these pre-processing operations, such as angular resampling, synchronous mean and synchronous variance calculations may also be used, the aim being to attenuate certain components of the raw signal such as, for example, a random component and/or noise.

The publications "A review of Vibration-Based Techniques for Helicopter Transmission Diagnostics" by P. D. Samuel (Journal of Sound and Vibration, 2005), "A Review on Vibration-Based Condition Monitoring of Rotating Machinery" by Monica Tiboni (Department of Mechanical and Industrial Engineering, University of Brescia, 2022) and "Cepstrum Analysis and Gearbox Fault Diagnosis" by R. B. Randall (Bruel & Kjaer) describe methods for analyzing vibration signals measured on rotating machines provided with gears, making it possible to diagnose these machines and determine the possible presence of faults.

Furthermore, document CN 102426102 describes a method for detecting the occurrence of a crack on a transmission shaft carrying a gear by analyzing a vibration signal measured in the vicinity of the gear and a signal comprising information relating to the speed of rotation of the transmission shaft.

Document FR 3 014 502 describes a method and device for detecting mechanical faults in a variable-speed rotating machine using vibration signatures generated by different speed ranges derived from measurement signals supplied by vibration sensors fitted to non-rotating components of the machine over several operating cycles. These vibration signatures are then compared with a reference vibration signature established for each vibration sensor in a fault-free mode of the rotating machine.

The development of a sensitive and robust fault detection system is essential in order to prevent catastrophic failures of power transmission systems, in particular for aircraft. Any improvement in the detection of the occurrence of a fault in a power transmission system significantly improves safety.

The prior art relates to the monitoring of frequencies linked to a fault, which are, in principle, known, but does not take into account the linear combinations of these frequencies or the overall change in the trends they display. The trend displayed by the energy of the frequency channels of the fault is generally monitored, but changes in the energy of the associated harmonics and the number of harmonics with significant energy are not taken into account.

SUMMARY

The aim of the present disclosure is therefore to propose an alternative method and an alternative device for improving the detection of the occurrence or presence of a fault in a mechanical system comprising at least one rotating member.

An object of the present disclosure is, for example, a method for detecting a fault in a mechanical system, the mechanical system comprising at least one rotating member that rotates about a rotation axis AX and a vibration sensor transmitting a temporal vibration signal, an angular sensor transmitting a temporal angular signal that varies as a function of an angular position of the rotating member about the rotation axis AX and a calculator.

The vibration sensor or sensors make it possible to measure characteristics, such as vibrations, for example, of the mechanical system as a whole or of one or more of its components, and to transmit a temporal vibration signal $x(t)$, i.e., a vibration signal in the time domain, carrying information relating to these characteristics, to the calculator, for example. The angular sensor makes it possible to measure an angular position of the rotating member about the rotation axis AX, in relation to a reference of mechanical system, for example a frame or a casing of the mechanical system, and to transmit a temporal angular signal $\theta(t)$, i.e., an angular signal in the time domain, carrying information relating to this angular position.

Such a mechanical system may comprise at least one of the following elements: at least one rotating member such as an input shaft and/or an output shaft, a rotational guide bearing, i.e., a rolling bearing provided with rolling elements, a toothed wheel, a pinion or a toothed ring gear. Such a mechanical system may, for example, be a transmission or a gearbox of a vehicle.

The method according to the disclosure comprises the following steps:
processing of temporal vibration signals $x_m(t)$ transmitted by the vibration sensor, comprising the following sub-steps:
transmission of M temporal vibration signals $x_m(t)$ by the vibration sensor, M being greater than or equal to 2, m being a positive integer varying from 1 to M, "t" being the operating time of the mechanical system;
first transformation, with the calculator, of the M temporal vibration signals $x_m(t)$ into M angular vibration signals $x_m(\theta)$ as a function of the temporal angular signal $\theta_m(t)$, "$\theta$" being an angle of the rotating member about the rotation axis AX;
second transformation, with the calculator, of the M angular vibration signals $x_m(\theta)$ into M frequency vibration signals $x_m(f_\theta)$ by means of a frequency operator $\vartheta$, where "$f_\theta$" is a frequency channel; and
first determination of trend frequency channels $f_t$ as a function of the M frequency vibration signals $x_m(f_\theta)$, a trend frequency channel $f_t$ being a frequency channel $f_\theta$ for which the M frequency vibration signals $x_m(f_\theta)$ satisfy a selection criterion relating to an increasing trend;
analysis, with the calculator, of the trend frequency channels $f_t$, comprising the following sub-steps:
comparison of each trend frequency channel $f_t$ with linear combinations of fault frequencies $f_d$ relating to the fault of interest, the linear combinations respectively comprising sums of several of the fault frequencies $f_d$ multiplied by integer coefficients ni; and
second determination of fault frequency channels $f_x$ as a function of the comparison, a fault frequency channel $f_x$ being a trend frequency channel $f_t$ for which the differences from the linear combinations are less than a comparison threshold;
calculation, with the calculator, of an indicator $I_{optimal}$ of the presence of the fault in the mechanical system as a function of the number of fault frequency channels $f_x$ and the number of linear combinations of fault frequencies $f_d$; and
triggering of a fault presence alert as a function of a comparison between the fault presence indicator $I_{optimal}$ and a fault presence threshold.

A vibration sensor, in the context of the disclosure, may, for example, comprise an accelerometer, a tachometer, an encoder-type sensor measuring an angular position of a shaft, a strain gauge or the like. Such a vibration sensor makes it possible to measure temporal vibration signals, comprising, for example, acceleration signals or speed signals. Such a vibration sensor may be positioned at different positions and in various orientations in the mechanical system. Such a vibration sensor may preferably be positioned on or in the vicinity of a rotating member, for example an input or output shaft, or a specific element to be monitored, such as a bearing, toothed wheel, pinion or toothed ring gear, for example. The vibration sensor can thus transmit a temporal vibration signal carrying information relating to the vibrations detected over time.

"Position" should be understood to mean the location where the vibration sensor is arranged in the mechanical system. "Orientation" should be understood to mean the angles of one or more preferred directions of measurement of the vibration sensor.

The angular sensor may be positioned in the vicinity of the rotating member whose angular position it is required to measure. The angular sensor can thus transmit a temporal angular signal carrying information relating to the variation in this angular position over time.

The temporal vibration signal and the temporal angular signal may be signals formed by raw measurements transmitted respectively by the vibration sensor and the angular sensor or by measurements obtained by relatively complex processing of signals carried out by the calculator or by a calculator integrated into the corresponding sensor on such raw measurements, for example via conventional filtering or sampling, or the application of transformations.

The temporal vibration signal and the temporal angular signal may be generated simultaneously or in a synchronized manner.

The vibration sensor therefore transmits M temporal vibration signals $x_m(t)$ during a predetermined period of operation of the mechanical system. The temporal vibration signals $x_m(t)$ are generally transmitted at substantially equal regular intervals and each comprise information relating to the vibrations experienced by part or all of the mechanical system during a predefined period of measurement Tf of the mechanical system. This measurement period Tf may be equal to several seconds or minutes and cover several operating cycles of the mechanical system, for example ten rotation cycles of the rotating member about the rotation axis AX, the angle $\theta$ of the rotating member being equal in this case to 3600°. However, temporal vibration signals $x_m(t)$ may also be transmitted with different intervals between them. For example, a temporal vibration signal $x_m(t)$ may be transmitted systematically after the mechanical system is started up, possibly once a stabilised rotation speed has been reached.

At the same time, the angular sensor transmits, during the predetermined period, M temporal angular signals $\theta(t)$ that may be associated and synchronized with the temporal vibration signals $x_m(t)$.

Each temporal vibration signal $x_m(t)$ and each temporal angular signal $\theta_m(t)$ is transmitted during a measurement period Tf, for example equal to several dozen seconds or a few minutes. The temporal vibration signals $x_m(t)$ and the temporal angular signals $\theta_m(t)$ may be stored in a memory of the calculator or in a memory connected to the calculator.

The calculator then applies two successive transformations to the M temporal vibration signals $x_m(t)$ in order to first transform them, in a conventional manner, into M angular vibration signals $x_m(\theta)$ and then, using a frequency operator $\vartheta$, transform the M angular vibration signals $x_m(\theta)$ into M frequency vibration signals $x_m(f_\theta)$. Each frequency vibration signal $x_m(f_\theta)$ is therefore derived from a temporal vibration signal $x_m(t)$ and therefore from a vibration measurement carried out on the mechanical system. The M frequency vibration signals $x_m(f_\theta)$ are therefore spectral signals discretized according to the angular position $\theta$ of the rotating member and vary as a function of a frequency channel $f_\theta$ that is linked to this angular position $\theta$. The frequency channels $f_\theta$ are therefore relative to the angular positions of the rotating member and not relative to time, as would be the case with a conventionally used frequency. "Frequency channels $f_\theta$" should be understood to mean the frequencies of these discretized spectral signals.

The angular vibration signals $x_m(\theta)$ and the frequency vibration signals $x_m(f_\theta)$ may be stored in the memory of the calculator or in the memory connected to the calculator.

One or more trend frequency channels $f_t$ indicating an increasing trend of the M frequency vibration signals $x_m(f_\theta)$ are then determined according to a selection criterion. The M frequency vibration signals $x_m(f_\theta)$ associated with a trend frequency channel $f_t$ thus indicate an increasing trend and satisfy this selection criterion relating to this increasing trend. The expression "the M frequency vibration signals $x_m(f_\theta)$ indicate an increasing trend" means that, for a given frequency channel $f_\theta$, the amplitudes of the M frequency vibration signals $x_m(f_\theta)$ increase from the first frequency vibration signal $x_1(f_\theta)$ to the last frequency vibration signal $x_M(f_\theta)$, following a curve, one characteristic of which may be this increasing trend.

Each trend frequency channel $f_t$ is therefore a frequency channel $f_\theta$ wherein the amplitudes $x_m(f_t)$ of the frequency vibration signals $x_m(f_\theta)$ relating to this trend frequency channel $f_t$ increase during the operation of the mechanical system. Each trend frequency channel $f_t$ is therefore a frequency channel $f_\theta$ that characterizes an increase in the vibrations during the operation of the mechanical system. This increase in the vibrations may therefore potentially characterize the occurrence, or the presence, of a fault in the mechanical system. The trend frequency channels $f_t$ may be stored in the memory of the calculator or in the memory connected to the calculator.

The calculator then analyses these trend frequency channels $f_t$ by comparing each trend frequency channel $f_t$ with linear combinations of fault frequencies $f_d$ relating to the specific fault of interest, and determines fault frequency channels $f_x$ following this comparison. The fault frequency channels $f_x$ may be stored in the memory of the calculator or in the memory connected to the calculator.

The fault frequencies $f_d$ relating to the fault of interest are known and defined in advance using feedback, tests or simulations. The fault frequencies $f_d$ may have been stored in advance in the memory of the calculator or in the memory connected to the calculator. Indeed, a fault in a mechanical system often causes modulations in amplitude and frequency in the vibrations of this mechanical system, giving rise to a set of excited frequency channels whose frequency can be expressed as a linear combination of the fault frequency or frequencies $f_d$.

Each fault frequency $f_d$ has, for example, been identified on a mechanical system having the fault of interest and for which the amplitudes of the measured vibration signals are significant. The fault frequency or frequencies $f_d$ associated with a specific fault of interest may be contained in a fault model. Therefore, several fault models may exist, respectively characterizing different types of faults likely to occur in the mechanical system.

Furthermore, a fault model may be parametric. The fault frequencies $f_d$ associated with the fault in question may then be variable as a function of operating parameters of the mechanical system, such as the operating phase of the mechanical system, and/or the torque of a rotating member, or indeed the temperature inside the mechanical system, for example. The fault frequencies $f_d$ may also be variable as a function of parameters external to the mechanical system, such as the temperature, for example.

Each linear combination comprises a sum of several of these fault frequencies $f_d$ multiplied by integer coefficients ni. Using these linear combinations therefore makes it possible to compare the trend frequency channels $f_t$ with the known fault frequencies $f_d$ and with some of their harmonic frequencies, depending on the coefficients ni used.

A fault frequency channel $f_x$ is thus determined and equal to a trend frequency channel $f_t$ for which the differences from the linear combinations are less than a comparison threshold, or indeed equal to zero. In this way, the trend frequency channels $f_t$ are selected that are linear combinations or "almost" linear combinations of the fault frequencies $f_d$ of the fault model relating to the fault of interest.

One or more fault frequency channels $f_x$ may thus be determined to be equal to one or more fault frequency channels $f_t$ respectively when these coincide, to within the comparison threshold, with a fault frequency $f_d$, with one of its harmonic frequencies or with linear combinations of these fault frequencies $f_d$. The comparison threshold may have been stored in advance in the memory.

The determination of one or more fault frequency channels $f_x$ thus characterizes a risk of presence of a fault in the mechanical system.

In order to confirm this risk, the calculator calculates a presence indicator $I_{optimal}$ characterizing this risk of presence of a fault in the mechanical system as a function of the number of fault frequency channels $f_x$ and the number of linear combinations of fault frequencies $f_d$. This presence indicator $I_{optimal}$ can then be compared with a fault presence threshold in order to confirm or rule out this risk. The fault presence threshold may have been stored in advance in the memory.

Therefore, a fault presence alert is triggered as a function of a comparison between the fault presence indicator $I_{optimal}$ and the fault presence threshold. This fault presence alert may be triggered by an alert generator. This fault presence alert may be a visual, audio and/or haptic alert, for example.

The method according to the disclosure thus makes it possible to reliably detect the occurrence or presence of a fault in the mechanical system as soon as frequency channels display a significant increasing trend, by identifying these frequency channels and then comparing them with linear combinations of known fault frequencies $f_d$ associated with the fault of interest. As a result, the detection of this fault can be brought forward, enabling it to be dealt with as early as possible, thereby avoiding the risks of aircraft flight interruption or cancellation, emergency landing or even an accident.

The method according to the disclosure may comprise one or more of the following features, taken individually or in combination.

According to one example, the comparison threshold may be predetermined and may, for example, be equal to a frequency resolution associated with the discretized frequency vibration signals.

According to another example compatible with the preceding examples, the predetermined period wherein the vibration sensor transmits the M temporal vibration signals $x_m(t)$ may be a sliding period.

As a result, when the vibration sensor transmits an (M+1)th temporal vibration signal $x_{M+1}(t)$, the method is then applied to M temporal vibration signals $x_m(t)$, m being between 2 and M+1. The (M+1)th temporal vibration signal $x_{M+1}(t)$ is, for example, stored in the memory and the first temporal vibration signal $x_1(t)$ may possibly be deleted from the memory.

The predetermined period may, for example, be equal to several hours or even several days of operation, depending on the mechanical system in question. The interval between two temporal vibration signals may, for example, be equal to several dozen minutes or several hours of operation of this mechanical system.

According to another example compatible with the preceding examples, a number of the integer coefficients ni may be limited, and the values of the integer coefficients ni may therefore be bounded.

Indeed, the higher the value of the coefficients ni, the greater the risk that frequency channels satisfying the fault frequency channel $f_x$ criterion will be confused with other physical phenomena in the system and, consequently, the risk of false faults being detected also increases.

Limiting the number of coefficients ni also makes it possible to limit the number of linear combinations and, consequently, the time required to calculate the fault frequency channels $f_x$.

According to another example compatible with the preceding examples, the fault presence indicator $I_{optimal}$ may increase when the number of fault frequency channels $f_x$ increases and the fault presence alert may be triggered if the presence indicator $I_{optimal}$ is greater than the fault presence threshold.

For example, the fault presence indicator $I_{optimal}$ may be equal to a ratio of a number of fault frequency channels $f_x$ to a total number of linear combinations of fault frequencies $f_d$ and the fault presence alert may be triggered if the presence indicator $I_{optimal}$ is greater than the fault presence threshold.

The presence indicator $I_{optimal}$ is thus normalized and between 0 and 1.

According to another example compatible with the preceding examples, the first determination of the trend frequency channels $f_t$ may comprise the following sub-steps:

generation, with the calculator, of at least one series of amplitudes $X_{f_\theta}$ associated with a frequency channel $f_\theta$ and comprising M values of amplitudes belonging respectively to the M frequency vibration signals and relating to the frequency channel $f_\theta$, the number of series of amplitudes $X_{f_\theta}$ being equal to the number of frequency channels $f_\theta$;

calculation, with the calculator, of a trend indicator $I_{trend}(f_\theta)$ for each frequency channel $f_\theta$ as a function of the series of amplitudes associated with the frequency channel $f_\theta$; and first determination, with the calculator, of trend frequency channels $f_t$, each trend frequency channel $f_t$ being a frequency channel $f_\theta$ satisfying the selection criterion, this selection criterion then being relative to the trend indicator $I_{trend}(f_\theta)$.

Each series of amplitudes $X_{f_\theta}$ thus comprises as many amplitude values as temporal vibration signals have been transmitted over the predetermined period. Each series of amplitudes $X_{f_\theta}$ thus characterizes the "energy levels" associated with the frequency channel $f_\theta$ with which this series of amplitudes $X_{f_\theta}$ is associated. Two distinct series of amplitudes $X_{f_\theta}$ are respectively associated with two distinct frequency channels $f_\theta$.

The first determination then makes it possible to identify, among the frequency channels $f_\theta$, the trend frequency channels $f_t$ for which these energy levels significantly increase during the predetermined period. Indeed, a trend indicator $I_{trend}(f_\theta)$ reflecting the increasing trend of trend frequency channels $f_t$ satisfies and fulfils the selection criterion, and can be indicative of the occurrence of the fault of interest.

Indeed, for almost all faults, the energy levels of the frequency channels associated with a fault increase slowly over a long period of time when the fault first occurs, and then increase progressively more rapidly until breakage occurs. The purpose of the trend indicator $I_{trend}(f_\theta)$ is therefore to identify the frequency channels $f_\theta$ that are in the slow increase phase. This makes it possible to identify them well before breakage occurs.

Each trend frequency channel $f_t$ is a frequency channel $f_\theta$ satisfying the selection criterion, this selection criterion then being relative to the trend indicator $I_{trend}(f_\theta)$.

According to a first selection criterion, each trend frequency channel $f_t$ is a frequency channel $f_\theta$ for which the trend indicator $I_{trend}(f_\theta)$ is greater than the trend threshold. Each trend frequency channel $f_t$ is, according to this first selection criterion, a frequency channel $f_\theta$ wherein the amplitudes $x_m(f_t)$ of the frequency vibration signals $x_m(f_\theta)$ relating to this trend frequency channel $f_t$ increase during the operation of the mechanical system faster than the amplitudes of a predetermined curve associated with the trend threshold.

The first determination then makes it possible to identify, among the frequency channels $f_\theta$, the trend frequency channels $f_t$ for which these energy levels significantly increase during the predetermined period, which may indicate the occurrence of the fault of interest if an increasing trend in these energy levels is greater than the trend threshold.

According to a second selection criterion, the trend frequency channels $f_t$ are the P frequency channels $f_\theta$ corresponding to the P highest trend indicators $I_{trend}(f_\theta)$, P being an integer greater than one. P is, for example, equal to 5. In this case, the trend frequency channels $f_t$ are, for example, the frequency channels $f_\theta$ for which the M temporal vibration signals $x_m(t)$ are characterized by the greatest increases.

Each trend frequency channel $f_t$ is, according to this second selection criterion, a frequency channel $f_\theta$ wherein the amplitudes $x_m(f_t)$ of the frequency vibration signals $x_m(f_\theta)$ relating to this trend frequency channel $f_t$ increase the fastest during the operation of the mechanical system. The first determination then makes it possible to identify, among the frequency channels $f_\theta$, the trend frequency channels $f_t$, for which these energy levels increase the fastest during the predetermined period, and which are likely to indicate the occurrence of the fault of interest.

Irrespective of which selection criterion is used, each trend frequency channel $f_t$ is therefore a frequency channel $f_\theta$ that characterizes an increase in the vibrations during the operation of the mechanical system. This increase in the vibrations may therefore potentially characterize the occurrence, or the presence, of a fault in the mechanical system. The trend frequency channels $f_t$ may be stored in the memory of the calculator or in the memory connected to the calculator.

The first and second selection criteria may be used separately or in a complementary manner, i.e., simultaneously.

Furthermore, each amplitude value of the at least one series of amplitudes $X_{f_\theta}$ may be associated with an instant $t_m$ when the transmission of the temporal vibration signal $x_m(t)$ from which the amplitude value is derived starts.

Alternatively, the instant $t_m$ may also correspond to the instant when a measurement of the vibrations experienced by the mechanical system starts, the temporal vibration signal $x_m(t)$ carrying information relating to these vibrations. The start of transmission of the temporal vibration signal $x_m(t)$ and the start of a measurement of the vibrations experienced by the mechanical system may be substantially identical and simultaneous.

Moreover, the calculation of a trend indicator $I_{trend}(f_\theta)$ may comprise the following sub-steps:

third transformation of the at least one series of amplitudes $X_{f_\theta}$ by a transformation function $\Phi$ into at least one trend series according to the relationship $g_{f_\theta} = \Phi(X_{f_\theta})$;

construction of at least one trend line from the at least one trend series by linear regression, according to the relationship $h_{f_\theta}(r) = A_{f_\theta} \times r + B_{f_\theta}$, where "r" is a variable;

"$h_{f_\theta}(r)$" is a trend line;

"$A_{f_\theta}$" is a directing coefficient of the trend line; and

"$B_{f_\theta}$" is the ordinate at the origin of the trend line;

estimation of a noise coefficient $\sigma_r$ for each trend line $h_{f_\theta}(r)$, according to the relationship $$\sigma_r(f_\theta) = \left| \frac{1}{M} \Sigma_{m=}^{M} \left( g_{f_\theta} - \left( A_{f_\theta} \times r + B_{f_\theta} \right) \right)^2 \right|^{1/2},$$

where "$\Sigma_{m=}^{M}$" is the sum function with m varying from 1 to M; and

"| |" is the absolute value function; and calculation of the trend indicator $I_{trend}$ as a function of the noise coefficient relating to the trend line for each frequency channel $f_\theta$, according to the relationship $$I_{trend}(f_\theta) = \frac{A_{f_\theta}}{\alpha + \beta \times \sigma_r(f_\theta)},$$

where "$\alpha$" and "$\beta$" are predetermined parameters.

The trend indicator $I_{trend}$ is thus calculated as a ratio between the slope of the linear regression and the noise level.

The parameters $\alpha$ and $\beta$ are used to weight noise sensitivity, i.e., the influence of this noise.

The parameters $\alpha$ and $\beta$ may be specific to each fault of interest.

The transformation function $\Phi$ may, for example, be the unit function or the logarithmic function or another mathematical function. The purpose of this third transformation is to obtain a generally linear change in the amplitude values after applying the transformation function $\Phi$ during the slow increase phase of these amplitude values in the event of a fault occurring. The choice of function $\Phi$ makes it possible, in particular, to obtain good sensitivity either at the beginning or at the end of propagation of the fault. The construction of a trend line by linear regression is then more precise and more reliable for obtaining a change slope and an estimation of the noise coefficient $\sigma_r$, and then to construct a robust and simple trend indicator $I_{trend}$.

Alternatively, transformations may be used to produce a characteristic change curve linked to the nature of change of the amplitude values associated with the frequency channels of the fault of interest. This characteristic change curve may be approximated by means of methods of curve fitting using a reduced parametric expression specific to this characteristic change curve. Thus, the parameters of the characteristic change curve and the estimation of the noise coefficient would also make it possible to construct a robust trend indicator $I_{trend}$ for identifying the trend frequency channels $f_t$.

The method according to the disclosure may also comprise a step of filtering the vibration signals in order to filter the vibration signals, in particular when these vibration signals are noisy. This filtering step may be applied to the temporal vibration signals $x_m(t)$, the angular vibration signals $x_m(\theta)$ or the frequency vibration signals $x_m(f_\theta)$, as well as to the series of amplitudes $X_{f_\theta}$. This filtering step allows the vibration signals and/or the series to be smoothed in a conventional manner, for example by applying median filtering or other existing filters.

The present disclosure also relates to a computer program comprising instructions which, when the program is run, cause it to implement the method described above. The computer program may, for example, be run by a calculator. The instructions are, for example, stored in a memory of the calculator or connected to the calculator.

The present disclosure also relates to a monitoring device for monitoring a mechanical system and configured to implement the method described above and thus to detect the presence of a fault in a mechanical system comprising at least one rotating member that rotates about a rotation axis AX. The monitoring device comprises at least a vibration sensor transmitting a temporal vibration signal, an angular sensor transmitting a temporal angular signal that varies as a function of an angular position of the rotating member about the rotation axis AX and a calculator.

The present disclosure also relates to a mechanical system comprising at least one rotating member that rotates about a rotation axis AX and a monitoring device as described above for monitoring the mechanical system and for detecting the presence of a fault in the mechanical system.

This mechanical system may, for example, be a gearbox of a vehicle, and in particular of an aircraft.

The present disclosure also relates to a gearbox comprising such a mechanical system.

The present disclosure may finally relate to an aircraft comprising such a gearbox.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
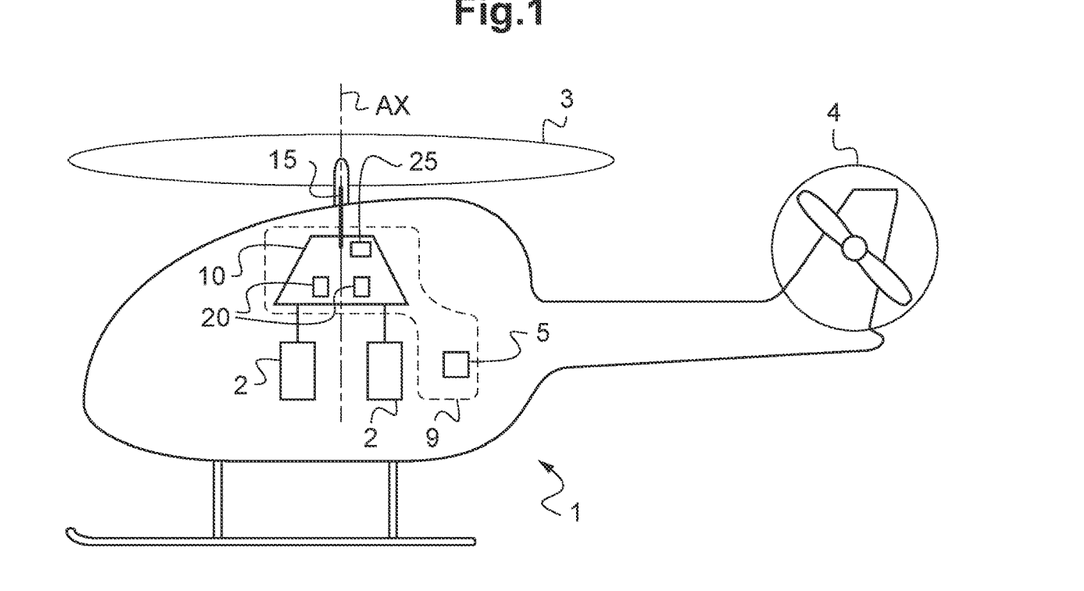
FIG. 1 is a schematic side view of an aircraft.

FIG. 1 shows a vehicle 1, and in particular a rotary-wing aircraft such as a rotorcraft. This vehicle 1 comprises a mechanical system 10 provided with one or more rotating members 15 that rotate about a rotation axis AX. A rotating member 15 may, for example, comprise an output shaft or an input shaft.

Such a mechanical system 10 may comprise one or more rotational guide bearings, for example, for guiding at least one rotating member in rotation. A bearing comprises a rolling bearing provided with rolling elements, for example.

Such a mechanical system 10 may also comprise, for example, at least a toothed wheel, pinion or toothed ring gear, which may be fixed or mobile.

This mechanical system 10 may, for example, be a transmission or a gearbox of the rotary wing aircraft 1. This mechanical system 10 may be connected, for example, to one or more engines 2, via one or more input shafts respectively, and may rotate a rotor, such as, for example, a main rotor 3 via an output shaft, or possibly an auxiliary rotor 4, as shown in FIG. 1.

Alternatively, such a mechanical system 10 may be arranged in a transmission or gearbox of a vehicle 1 or any other piece of mechanical equipment.

Irrespective of its arrangement, the mechanical system 10 also comprises one or more vibration sensors 20, an angular sensor 25 measuring an angular position of a rotating member 15 about a rotation axis AX and a calculator 5. The mechanical system 10 may comprise several angular sensors 25 arranged respectively on several different rotating members 15.

Each vibration sensor 20 can measure and/or transmit a temporal vibration signal relating to vibrational behavior of the mechanical system 10 as a whole, or to particular vibrational behavior of a rotating member 15, a bearing or a gear, for example. The temporal vibration signal carries information relating to the vibrations of the mechanical system 10 or one of its components. The vibration sensor or sensors 20 may, for example, comprise an accelerometer, a tachometer, an encoder-type sensor and/or a strain gauge.

The angular sensor 25 measures an angular position of a rotating member 15 about a rotation axis AX. The angular position of the rotating member 15 about the rotation axis AX may be defined in relation to a reference frame of the mechanical system 10, for example a casing of the mechanical system 10. The angular sensor 25 can measure and/or transmit a temporal signal carrying information relating to the angular position of the rotating member 15 about the rotation axis AX.

The angular sensor 25 may comprise an angular position sensor directly measuring a temporal signal indicating the variation of the angular position of the rotating member 15 as a function of time.

Alternatively, the angular sensor 25 may comprise an angular speed sensor or an angular acceleration sensor measuring a temporal signal relating respectively to an angular speed or to an angular acceleration which must undergo single integration or double integration, in order to generate a temporal signal supplying the variation in the angular position of the rotating member 15 as a function of time. This single or double integration may be carried out by the calculator 5. This single or double integration may also be carried out by a calculator integrated into the angular sensor 25.

The calculator may comprise at least one processor and at least one memory, at least one integrated circuit, at least one programmable system or indeed at least one logic circuit, these examples not limiting the scope given to the expression "calculator". The calculator 5 may also be connected to a memory by a wired or wireless link.

The memory may, for example, store instructions or algorithms relating to the implementation of a method for detecting a fault in the mechanical system 10 and one or more thresholds corresponding to this method. The memory may also store a calculator program intended to be run by the calculator 5 in order to implement the fault detection method.

The vibration sensor or sensors 20 and the angular sensor 25 and the calculator 5 may be part of a monitoring device 9 for monitoring the mechanical system 10 intended to monitor the mechanical system in order to detect and identify a risk of occurrence or presence of a fault likely to result in a failure or malfunction of the mechanical system 10.

The calculator 5 may be dedicated to the monitoring device 9 or be shared with other devices of the aircraft 1.

Figure 2:
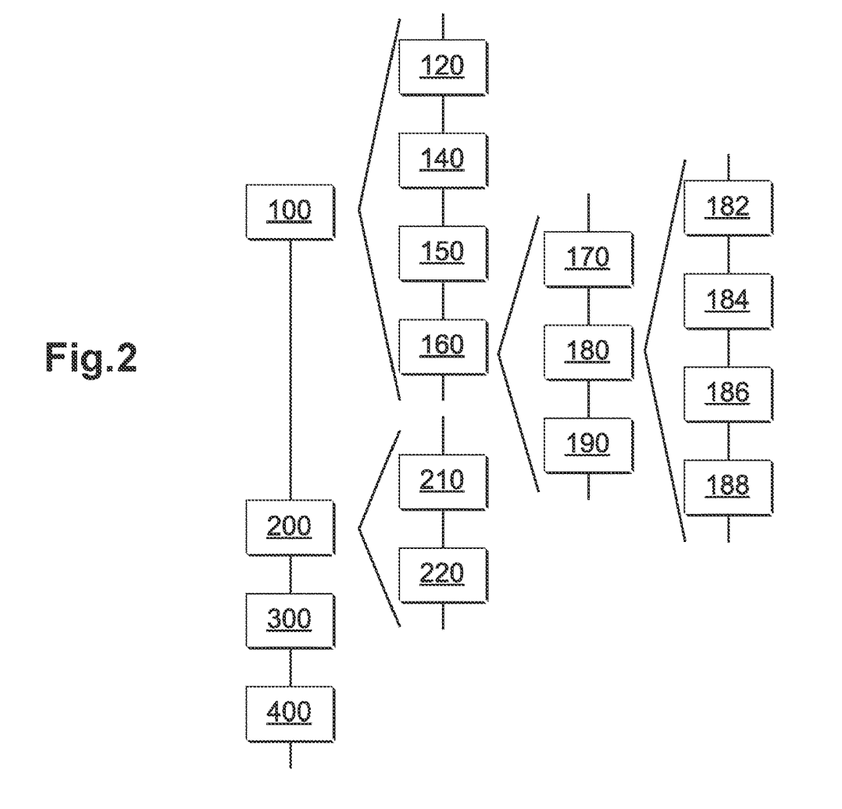
FIG. 2 is a diagram showing a method for detecting a fault in a mechanical system.

The fault detection method according to the disclosure comprises four main steps as shown in the diagram in FIG. 2. A first main processing step 100 processes the temporal vibration signals $x_m(t)$ in order to determine trend frequency channels $f_t$ likely to correspond to a fault present in the mechanical system 10. A second main analysis step 200 analyses these trend frequency channels $f_t$ in order to identify fault frequency channels $f_x$ among them that correspond to the fault of interest.

Next, a third main calculation step 300 is used to calculate an indicator $I_{optimal}$ of the presence of the fault of interest in the mechanical system 10 and a fourth main triggering step 400 triggers a fault presence alert as a function of this fault presence indicator $I_{optimal}$ and a fault presence threshold.

As a result, the detection of a fault in the mechanical system 10 can be reliably brought forward to the first signs of its occurrence, as the presence of this fault can be detected through the vibrations of this mechanical system 10.

The first main processing step 100 comprises several sub-steps.

Therefore, during a transmission step 120, M temporal vibration signals $x_m(t)$ are transmitted by the vibration sensor 20, for example over a predetermined period of operation of the mechanical system 10. This predetermined period may be a sliding period. M is an integer greater than or equal to 2, and m is an integer varying from 1 to M identifying the number of the temporal vibration signal $x_m(t)$ and therefore the number of the vibration measurement of the mechanical system 10. "t" is the operating time of the mechanical system 10. The operating time t is considered to be stopped when the mechanical system 10 is not operating.

The M temporal vibration signals $x_m(t)$ preferably correspond to vibration measurements carried out at operating speeds of the mechanical system 10 that are substantially similar and close to each other. Operating speeds are considered to be close, for example, if the differences in the rotational speeds of the rotating member 15 are less than 10% and if the differences in the torques of the rotating member 15 are less than 30%.

Each temporal vibration signal $x_m(t)$ corresponds to a measurement of the vibrations of the mechanical system 10 carried out during a measurement period Tf which is preferably identical for all of the temporal vibration signals $x_m(t)$.

Simultaneously, M temporal angular signals $\theta(t)$ are transmitted by the angular sensor 25, "$\theta$" being an angle of the rotating member 15 about the rotation axis AX. The M temporal vibration signals $x_m(t)$ and the M temporal angular signals $\theta_m(t)$ are transmitted, in the form of electrical, optical, analog or digital signals, via a wired or wireless link, to the calculator 5.

Alternatively, the vibration sensor or sensors 20 and the angular sensor 25 may continuously transmit a temporal vibration signal $x(t)$ and a temporal angular signal $\theta(t)$ to the calculator 5 which stores the M temporal vibration signals $x_m(t)$ and the M temporal angular signals $\theta(t)$ in the memory at regular intervals.

Next, during a first transformation step 140, the calculator 5 transforms the M temporal vibration signals $x_m(t)$ into M angular vibration signals $x_m(\theta)$ as a function of the temporal angular signal $\theta(t)$, in a known manner.

This transformation of the temporal vibration signal $x_m(t)$ from the time domain to the angular domain advantageously makes it possible to associate the variations of the angular vibration signal with the angular positions of the rotating member 15, and therefore with positions of the elements of the mechanical system 10. This first transformation step 140 therefore enables the temporal vibration signal $x_m(t)$ to be resampled in the angular domain in order to attenuate, in particular, the effect of fluctuations in the rotational speed of the rotating member 15 on the vibration measurements. Indeed, the speed of rotation of the rotating member 15 is not systematically constant, in particular during transient phases, for example when the mechanical system 10 is being started up or during speed changes and in the event of the mechanical system 10 being subjected to heavy loads.

Next, during a second transformation step 150, the calculator 5 transforms the M angular vibration signals $x_m(\theta)$ into M frequency vibration signals $x_m(f_\theta)$ by means of a frequency operator $\vartheta$. This second transformation can be expressed according to the relationship $x_m(f_\theta)=\vartheta(x_m(\theta))$, where "$f_\theta$" is a frequency channel. The frequency channels $f_\theta$ are obtained from the second transformation using the frequency operator $\vartheta$ from the M angular vibration signals $x_m(\theta)$ as a function of the angle $\theta$ of the rotating member 15 about the rotation axis AX.

This second transformation from the angular domain to the frequency domain advantageously makes it possible to identify the energy levels of the frequency channels $f_\theta$ of the vibrations of the mechanical system 10.

The frequency operator $\vartheta$ may be different depending on the fault of interest. The frequency operator $\vartheta$ may, for example, be a Fourier Transform, an envelope spectrum or another transformation.

Finally, during a first determination 160, the calculator 5 determines trend frequency channels $f_t$ as a function of the M frequency vibration signals $x_m(f_\theta)$, a trend frequency channel $f_t$ being a frequency channel $f_\theta$ for which the M frequency vibration signals $x_m(f_\theta)$ satisfy a selection criterion relating to an increasing trend. A trend frequency channel $f_t$ corresponds, for example, to a frequency channel $f_\theta$ for which the energy levels of the vibrations of the mechanical system 10 are increasing and are therefore likely to correspond to the occurrence of a fault present in the mechanical system 10.

The first determination 160 of the trend frequency channels $f_t$ may comprise several sub-steps.

During a generation sub-step 170, the calculator 5 generates at least one series of amplitudes $X_{f_\theta}$ associated with a frequency channel $f_\theta$ and comprising M values of amplitudes belonging respectively to the M frequency vibration signals and relative to this frequency channel $f_\theta$. The number of series of amplitudes $X_{f_\theta}$ is equal to the number of frequency channels $f_\theta$. The amplitudes of each series of amplitudes $X_{f_\theta}$ characterize the energy of vibrations for each of the frequency channels $f_\theta$.

Each amplitude value of the series of amplitudes $X_{f_\theta}$ may be associated with the number m relating to each vibration measurement.

Alternatively, each amplitude value of the series of amplitudes $X_{f_\theta}$ may be associated with an instant $t_m$ when the transmission of the temporal vibration signal $x_m(t)$ from which the amplitude value is derived starts. This association is advantageous in particular when the vibration measurements are not carried out at regular intervals, in order to take into account the irregular intervals between two vibration measurements.

Furthermore, a sub-step of filtering the amplitude values of the series of amplitudes $X_{f_\theta}$ may be applied. Alternatively, such a filtering sub-step may also be applied to the series of temporal vibration signals $x_m(t)$, to the series of angular vibration signals $x_m(\theta)$.

Next, during a calculation sub-step 180, the calculator 5 calculates a trend indicator $I_{trend}(f_\theta)$ for each frequency channel $f_\theta$ as a function of the series of amplitudes associated with the frequency channel $f_\theta$.

Next, during a first determination sub-step 190, the calculator 5 determines trend frequency channels $f_t$ by checking, for each frequency channel $f_\theta$, whether the trend indicator $I_{trend}(f_\theta)$ satisfies and fulfils the selection criterion.

For example, a first selection criterion may comprise a trend threshold. Each trend frequency channel $f_t$ is then a frequency channel $f_\theta$ for which the trend indicator $I_{trend}(f_\theta)$ is greater than the trend threshold. A trend frequency channel $f_t$ is therefore the frequency channel $f_\theta$ for which the series of amplitudes is generally increasing when m varies from 1 to M, and therefore having an increasing trend greater than a predefined trend corresponding to the trend threshold.

According to a second selection criterion, the trend frequency channels $f_t$ are the P frequency channels $f_\theta$ for which the trend indicators $I_{trend}(f_\theta)$ are the highest, P being an integer greater than one. The trend frequency channels $f_t$ are the frequency channels $f_\theta$ for which the series of amplitudes are generally increasing when m varies from 1 to M and that comprise the M temporal vibration signals $x_m(t)$ characterized by the greatest increases in their respective energy levels.

A single selection criterion from the first and second selection criteria may be used.

Alternatively, the first and second selection criteria may be used simultaneously in a complementary manner. For example, when the number of frequency channels $f_\theta$ for which the trend indicator $I_{trend}(f_\theta)$ is greater than the trend threshold is less than P, only these frequency channels $f_\theta$ whose trend indicator $I_{trend}(f_\theta)$ is greater than the trend threshold are trend frequency channels $f_t$. Conversely, when the number of frequency channels $f_\theta$ for which the trend indicator $I_{trend}(f_\theta)$ is greater than the trend threshold is greater than P, only the P frequency channels $f_\theta$ whose trend indicators $I_{trend}(f_\theta)$ are the highest are trend frequency channels $f_t$.

Furthermore, the calculation 180 of the trend indicator $I_{trend}(f_\theta)$ can be broken down into several sub-steps.

During a third transformation sub-step 182, the calculator 5 transforms each series of amplitudes $X_{f_\theta}$ into a trend series by means of a transformation function $\Phi$ according to the relationship $g_{f_\theta} = \Phi(X_{f_\theta})$. The purpose of the transformation function $\Phi$ is to make as linear as possible the amplitude values of each series of amplitudes $X_{f_\theta}$ which show an increasing trend consistent with the fault model. The transformation function $\Phi$ may be different depending on the fault of interest. The transformation function $\Phi$ may, for example, be the unit function if the fault has a substantially "linear" increase or the logarithmic function if the fault has a substantially "exponential" increase.

During a construction sub-step 184, the calculator 5 constructs a trend line for each trend series by linear regression, according to the relationship $h_{f_\theta}(r) = A_{f_\theta} \times r + B_{f_\theta}$, where "r" is a variable;

"$h_{f_\theta}(r)$" is a trend line;

"$A_{f_\theta}$" is a directing coefficient of the trend line; and

"$B_{f_\theta}$" is the ordinate at the origin of the trend line.

During an estimation sub-step 186, the calculator 5 estimates a noise coefficient $\sigma_r$ for each trend line $h_{f_\theta}(r)$, according to the relationship $$\sigma_r(f_\theta) = \left| \frac{1}{M} \Sigma_{m=1}^{M} \left( g_{f_\theta} - (A_{f_\theta} \times r + B_{f_\theta}) \right)^2 \right|^{1/2},$$

where "$\Sigma_{m=1}^{M}$" is the sum function with m varying from 1 to M; and

"| |" is the absolute value function.

During a calculation sub-step 188, the calculator 5 calculates the trend indicator $I_{trend}$ as a function of the directing coefficient $A_{f_\theta}$ of the trend line $h_{f_\theta}(r)$ and the noise coefficient relating to the trend line for each frequency channel $f_\theta$, according to the relationship $$I_{trend}(f_\theta) = \frac{A_{f_\theta}}{\alpha + \beta \times \sigma_r(f_\theta)}.$$

The parameters $\alpha$ and $\beta$ are predetermined parameters used to weight noise sensitivity. $\alpha$ is used, in particular, to establish an upper limit of the trend indicator $I_{trend}$ in order to limit its divergence when the noise $\sigma_r(f_\theta)$ tends towards 0, while $\beta$ is used to adjust its noise sensitivity.

The parameters $\alpha$ and $\beta$ may be specific to each fault of interest, but common to all frequency channels.

The main analysis step 200 for analyzing the trend frequency channels $f_t$ comprises the following sub-steps.

During a comparison step 210, the calculator 5 compares each trend frequency channel $f_t$ with linear combinations of fault frequencies $f_d$ relating to the fault of interest. The fault frequencies $f_d$ are known in advance and contained in a fault model associated with the fault of interest. Indeed, most mechanical faults in a mechanical system 10 cause modulations in amplitude and frequency in the vibrations of this mechanical system 10. Therefore, for a given fault present in the mechanical system 10, specific frequencies referred to as "fault frequencies $f_d$" may be excited during the operation of the mechanical system 10, i.e., may have energy levels that follow a "law" of increase consistent with the fault of interest. Moreover, these fault frequencies $f_d$ vary little as a function of the operating parameters of this mechanical system 10, these parameters having an influence mainly on the amplitude of the vibration signal for these fault frequencies $f_d$.

Linear combinations of fault frequencies $f_d$ respectively comprise sums of several, or indeed all, of the fault frequencies $f_d$ multiplied by integer coefficients ni. The values of the coefficients ni are bounded and the number of integer coefficients ni is limited. The coefficients ni are, for example, between −4 and 4. Therefore, the number of these linear combinations of fault frequencies $f_d$ is also limited.

These linear combinations of fault frequencies $f_d$ are such that:

$$\begin{cases} n_1 F_1 - \ldots n_i F_i \ldots - n_k F_k \\ N_{1\,min} < n_1 < N_{1\,max} \\ \quad \vdots \\ N_{k\,min} < n_k < N_{k\,max} \\ \{n_1, \ldots, n_i, \ldots, n_k\} \in \mathbb{Z} \end{cases}$$

Where k is the number of fault frequencies $f_d$;

$F_1, \ldots, F_i, \ldots, F_k$ are the k fault frequencies $f_d$ where $1 \leq i \leq k$;

$n_i$ is a coefficient of the linear combination associated with the frequency $F_i$;

$N_{i\,min}$ is a lower limit of $n_i$; and $N_{i\,max}$ is an upper limit of $n_i$.

Next, during a second determination step 220, the calculator 5 determines fault frequency channels $f_x$ as a function of the comparison of the trend frequency channels $f_t$ with linear combinations of fault frequencies $f_d$. A fault frequency channel $f_x$ is thus determined to be equal to a trend frequency channel $f_t$ for which the differences from the linear combinations are less than a comparison threshold. The comparison threshold is low and, for example, equal to a frequency resolution associated with the discretized frequency vibration signals.

This second determination involves searching the trend frequency channels $f_t$ for those that help minimize the differences between each trend frequency channel $f_t$ and these linear combinations of fault frequencies $f_d$. At the end of these comparisons, the trend frequency channels $f_t$ for which the result of these differences is a zero or near-zero frequency, i.e., less than the comparison threshold, are selected as the fault frequency channels $f_x$.

This second main analysis step 200 therefore makes it possible to identify fault frequency channels $f_x$ whose energy levels display an increasing trend and which correspond to characteristic frequencies of the fault of interest.

During the main calculation step 300, the indicator $I_{optimal}$ of the presence of the fault in the mechanical system 10 is calculated.

For example, the presence indicator $I_{optimal}$ may be defined in such a way as to increase when the number of fault frequency channels $f_x$ increases. The fault presence alert is then triggered if the presence indicator $I_{optimal}$ is greater than the fault presence threshold.

For example, the fault presence indicator $I_{optimal}$ may be equal to a ratio of a number of fault frequency channels $f_x$ to a total number of linear combinations of fault frequencies $f_d$. The fault presence alert is then triggered if the presence indicator $I_{optimal}$ is greater than the fault presence threshold.

The presence indicator $I_{optimal}$ is thus normalized, i.e., between 0 and 1. Therefore, a threshold for the presence of a single fault may be applicable to the detection of several different types of fault likely to occur in the mechanical system 10.

Moreover, the presence indicator $I_{optimal}$ is zero when none of the fault frequencies $f_d$ of the fault model expresses an increasing trend and has therefore been identified among the trend frequency channels $f_t$. Conversely, the presence indicator $I_{optimal}$ is equal to 1 when all of the fault frequencies $f_d$ of the fault model display an increasing trend.

Furthermore, the higher the number of fault frequency channels $f_x$, the higher the presence indicator $I_{optimal}$. Therefore, the higher the presence indicator $I_{optimal}$, the higher the risk of presence of a fault and the more confidence there can be that the fault is present.

The method according to the disclosure can therefore be used to determine a presence indicator $I_{optimal}$ that is reliable, effective and robust for detecting a fault in the mechanical system 10, from the first signs that this fault has occurred.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for detecting a fault in a mechanical system, the mechanical system comprising at least one rotating member that rotates about a rotation axis (AX) and a vibration sensor transmitting a temporal vibration signal x(t), an angular sensor transmitting a temporal angular signal θ(t) that varies as a function of an angular position of the rotating member about the rotation axis (AX) and a calculator, the method comprising the following steps:
processing of temporal vibration signals $x_m(t)$ transmitted by the vibration sensor, comprising the following sub-steps:
transmission of M temporal vibration signals $x_m(t)$ by the vibration sensor, M being greater than or equal to 2, m being a positive integer varying from 1 to M, "t" being the operating time of the mechanical system;
first transformation, with the calculator, of the M temporal vibration signals $x_m(t)$ into M angular vibration signals $x_m(θ)$ as a function of the temporal angular signal $θ_m(t)$, "θ" being an angle of the rotating member about the rotation axis (AX);
second transformation, with the calculator, of the M angular vibration signals $x_m(θ)$ into M frequency vibration signals $x_m(f_θ)$ by means of a frequency operator $\vartheta$, where "$f_θ$" is a frequency channel; and
first determination of trend frequency channels $f_t$ as a function of the M frequency vibration signals $x_m(f_θ)$, a trend frequency channel $f_t$ being a frequency channel $f_θ$ for which the M frequency vibration signals $x_m(f_θ)$ satisfy a selection criterion relating to an increasing trend;
analysis, with the calculator, of the trend frequency channels $f_t$, comprising the following sub-steps:
comparison of each trend frequency channel $f_t$ with linear combinations of fault frequencies $f_d$ relating to the fault of interest, the linear combinations respectively comprising sums of several of the fault frequencies $f_d$ multiplied by integer coefficients ni; and
second determination of fault frequency channels $f_x$ as a function of the comparison, a fault frequency channel $f_x$ being a trend frequency channel $f_t$ for which the differences from the linear combinations are less than a comparison threshold;
calculation, with the calculator, of an indicator $I_{optimal}$ of the presence of the fault in the mechanical system as a function of the number of the fault frequency channels $f_x$ and the number of the linear combinations of the fault frequencies $f_d$; and
triggering of a fault presence alert as a function of a comparison between the fault presence indicator $I_{optimal}$ and a fault presence threshold.

2. The method according to claim 1,
for which the first determination of the trend frequency channels $f_t$ comprises the following sub-steps:
generation, with the calculator, of at least one series of amplitudes $X_{f_θ}$ associated with a frequency channel $f_θ$ and comprising M values of amplitudes belonging respectively to the M frequency vibration signals and relating to the frequency channel $f_θ$, the number of the series of amplitudes $X_{f_θ}$ being equal to the number of frequency channels $f_θ$;
calculation, with the calculator, of a trend indicator $I_{trend}(f_θ)$ for each frequency channel $f_θ$ as a function of the series of amplitudes associated with the frequency channel $f_θ$; and
first determination (190), with the calculator, of trend frequency channels $f_t$, each trend frequency channel $f_t$ being a frequency channel $f_θ$ satisfying the selection criterion, the selection criterion being relative to the trend indicator $I_{trend}(f_θ)$.

3. The method according to claim 2,
for which, according to the selection criterion, each trend frequency channel $f_t$ is a frequency channel $f_θ$ for which the trend indicator $I_{trend}(f_θ)$ is greater than the trend threshold.

4. The method according to claim 2,
for which, according to the selection criterion, the trend frequency channels $f_t$ are the P frequency channels $f_θ$ corresponding to the P highest trend indicators $I_{trend}(f_θ)$, P being an integer greater than one.

5. The method according to claim 2,
for which each amplitude value of the series of amplitudes $X_{f_θ}$ is associated with an instant $t_m$ when the transmission of the temporal vibration signal $x_m(t)$ from which the amplitude value is derived starts.

6. The method according to claim 2,
for which the calculation of a trend indicator $I_{trend}(f_θ)$ comprises the following sub-steps:
third transformation of the series of amplitudes $X_{f_θ}$ by a transformation function Φ into at least one trend series according to the relationship $g_{f_θ}=Φ(X_{f_θ})$;
construction of at least one trend line from the trend series by linear regression, according to the relationship $h_{f_θ}(r)=A_{f_θ} \times r + B_{f_θ}$,
where "r" is a variable;
"$h_{f_θ}(r)$" is a trend line;
"$A_{f_θ}$" is a directing coefficient of the trend line; and
"$B_{f_θ}$" is the ordinate at the origin of the trend line;
estimation of a noise coefficient $σ_r$ for each trend line $h_{f_θ}(r)$, according to the relationship $$\sigma_r(f_\theta) = \left| \frac{1}{M} \Sigma_{m=1}^{M} (g_{f_\theta} - (A_{f_\theta} \times r + B_{f_\theta}))^2 \right|^{1/2},$$

where "$\Sigma_{m=1}^{M}$" is the sum function with m varying from 1 to M; and
"| |" is the absolute value function; and calculation (188) of the trend indicator $I_{trend}$ as a function of the noise coefficient relating to the trend line for each frequency channel $f_\theta$, according to the relationship $$I_{trend}(f_\theta) = \frac{A_{f_\theta}}{\alpha + \beta \times \sigma_r(f_\theta)},$$

where "α" and "β" are predetermined parameters.

7. The method according to claim 6,
for which the transformation function Φ is the unit function or the logarithmic function.

8. The method according to claim 7,
for which the parameters α and β are specific to each fault of interest.

9. The method according to claim 1,
for which the fault presence indicator $I_{optimal}$ increases when the number of the fault frequency channels $f_x$ increases and the fault presence alert is triggered if the presence indicator $I_{optimal}$ is greater than the fault presence threshold.

10. The method according to claim 1,
for which a number of the integer coefficients ni is limited, and values of the integer coefficients ni are bounded.

11. The method according to claim 10,
for which the fault presence indicator $I_{optimal}$ is equal to a ratio of a number of the fault frequency channels $f_x$ to a total number of linear combinations of the fault frequencies $f_d$ and the fault presence alert is triggered if the presence indicator $I_{optimal}$ is greater than the fault presence threshold.

12. The method according to claim 1,
for which the comparison threshold is equal to a frequency resolution associated with the discretized frequency vibration signals.

13. The method according to claim 1,
for which the vibration sensor(s) transmit(s) the M temporal vibration signals $x_m(t)$ during a sliding predetermined period of operation of the mechanical system.

14. A calculator program comprising instructions which, when the program is run, cause the method according to claim 1 to be implemented.

15. A monitoring device configured to monitor a mechanical system, the mechanical system comprising at least one rotating member that rotates about a rotation axis (AX), the monitoring device comprising at least a vibration sensor transmitting a temporal vibration signal, an angular sensor transmitting a temporal angular signal that varies as a function of an angular position of the rotating member about the rotation axis (AX) and a calculator,
wherein the monitoring device is configured to implement the method according to claim 1.

16. A mechanical system comprising at least one rotating member that rotates about a rotation axis (AX),
wherein the mechanical system comprises the monitoring device according to claim 15.

17. A gearbox comprising the mechanical system according to claim 16.

* * * * *